(12) United States Patent
Lim et al.

(10) Patent No.: US 11,577,969 B2
(45) Date of Patent: *Feb. 14, 2023

(54) TRANSITION METAL PRECURSOR HAVING LOW TAP DENSITY AND LITHIUM TRANSITION METAL OXIDE HAVING HIGH PARTICLE STRENGTH

(71) Applicant: LG Chem, Ltd., Seoul (KR)

(72) Inventors: Jinhyung Lim, Daejeon (KR); Sung-Kyun Chang, Daejeon (KR); Won Seok Chang, Daejeon (KR); Sin Young Park, Daejeon (KR); Ho Suk Shin, Daejeon (KR); Hyun Jin Oh, Daejeon (KR); Jung Min Han, Daejeon (KR); In Sung Uhm, Daejeon (KR); Wang Mo Jung, Daejeon (KR); Dong Hun Lee, Daejeon (KR)

(73) Assignee: LG Energy Solution, Ltd.

( * ) Notice: Subject to any disclaimer, the term of this patent is extended or adjusted under 35 U.S.C. 154(b) by 350 days.

This patent is subject to a terminal disclaimer.

(21) Appl. No.: 14/441,580

(22) PCT Filed: Feb. 11, 2014

(86) PCT No.: PCT/KR2014/001107
§ 371 (c)(1),
(2) Date: May 8, 2015

(87) PCT Pub. No.: WO2014/126373
PCT Pub. Date: Aug. 21, 2014

(65) Prior Publication Data
US 2016/0002063 A1  Jan. 7, 2016

(30) Foreign Application Priority Data

Feb. 13, 2013 (KR) .................. 10-2013-0015206

(51) Int. Cl.
*C01G 53/04* (2006.01)
*C01G 53/00* (2006.01)
(Continued)

(52) U.S. Cl.
CPC .......... *C01G 53/04* (2013.01); *C01G 53/006* (2013.01); *C01G 53/50* (2013.01); *H01M 4/505* (2013.01);
(Continued)

(58) Field of Classification Search
None
See application file for complete search history.

(56) References Cited

U.S. PATENT DOCUMENTS

2009/0117469 A1  5/2009 Hiratsuka et al.
2010/0310869 A1  12/2010 Jahn et al.
(Continued)

FOREIGN PATENT DOCUMENTS

CN   1725534 A    1/2006
CN   101687666 A  3/2010
(Continued)

OTHER PUBLICATIONS

International Search Report for Application No. PCT/KR2014/001107 dated May 15, 2014.
(Continued)

*Primary Examiner* — Haixia Zhang
(74) *Attorney, Agent, or Firm* — Lerner, David, Littenberg, Krumholz & Mentlik, LLP (57) ABSTRACT

Disclosed are a transition metal precursor for preparation of a lithium transition metal oxide, in which a ratio of tap density of the precursor to average particle diameter D50 of
(Continued)

the precursor satisfies the condition represented by Equation 1 below, and a lithium transition metal oxide prepared using the same.

$$0 < \frac{\text{Tap density}}{\text{Average particle diameter } D50 \text{ of transition of metal precursor}} < 3500 \text{ (g/cc·cm)} \quad (1)$$

2 Claims, 3 Drawing Sheets

(51) Int. Cl.
  *H01M 10/0525* (2010.01)
  *H01M 10/052* (2010.01)
  *H01M 4/505* (2010.01)
  *H01M 4/525* (2010.01)
  *H01M 4/02* (2006.01)

(52) U.S. Cl.
  CPC ......... *H01M 4/525* (2013.01); *H01M 10/052* (2013.01); *H01M 10/0525* (2013.01); *C01P 2002/50* (2013.01); *C01P 2002/52* (2013.01); *C01P 2004/61* (2013.01); *C01P 2006/11* (2013.01); *H01M 2004/028* (2013.01); *Y02T 10/70* (2013.01)

(56) References Cited

U.S. PATENT DOCUMENTS

| | | |
|---|---|---|
| 2011/0180748 A1 | 7/2011 | Jahn et al. |
| 2012/0043499 A1 | 2/2012 | Shin et al. |
| 2012/0104311 A1 | 5/2012 | Levasseur et al. |
| 2012/0321956 A1 | 12/2012 | Kawahashi et al. |
| 2013/0045421 A1 | 2/2013 | Kobino et al. |
| 2013/0071661 A1 | 3/2013 | Chen et al. |
| 2013/0108926 A1 | 5/2013 | Kim et al. |
| 2013/0168600 A1 | 7/2013 | Niittykoski et al. |
| 2015/0210561 A1 | 7/2015 | Jahn et al. |

FOREIGN PATENT DOCUMENTS

| | | |
|---|---|---|
| CN | 101809788 A | 8/2010 |
| CN | 102362378 A | 2/2012 |
| CN | 102763247 A | 10/2012 |
| DE | 102007039471 A1 | 2/2009 |
| EP | 2209741 A1 | 7/2010 |
| EP | 2314545 A1 | 4/2011 |
| EP | 2663527 A2 | 11/2013 |
| JP | 2001106534 A | 4/2001 |
| JP | 2005071623 A | 3/2005 |
| JP | 2010192424 A | 9/2010 |
| JP | 2010536697 A | 12/2010 |
| JP | 2011516384 A | 5/2011 |
| JP | 2012038562 A | 2/2012 |
| JP | 2013144625 A | 7/2013 |
| JP | 2014506220 A | 3/2014 |
| KR | 20100066455 A | 6/2010 |
| KR | 20100067086 A | 6/2010 |
| KR | 20100131430 A | 12/2010 |
| KR | 20110132287 A | 12/2011 |
| KR | 20150050153 A | 5/2015 |
| WO | 2011049185 A1 | 4/2011 |
| WO | 2012037975 A1 | 3/2012 |
| WO | 2012095381 A2 | 7/2012 |

OTHER PUBLICATIONS

Office Action from European Application No. 14751920.1, dated Dec. 23, 2016.

[FIG. 1]

PARTICLE DIAMETER OF PRECURSOR(D50)/[um]

TRANSITION METAL PRECURSOR HAVING LOW TAP DENSITY AND LITHIUM TRANSITION METAL OXIDE HAVING HIGH PARTICLE STRENGTH

CROSS-REFERENCE TO RELATED APPLICATION

This application is a national phase entry under 35 U.S.C. § 371 of International Application No. PCT/KR2014/001107, filed Feb. 11, 2014, which claims priority to Korean Patent Application No. 10-2013-0015206, filed Feb. 13, 2013, the disclosures of which are incorporated herein by reference.

TECHNICAL FIELD

The present invention relates to a repeatedly chargeable and dischargeable lithium secondary battery. More particularly, the present invention relates to a lithium transition metal oxide used as a positive electrode active material of lithium secondary batteries and a transition metal precursor for preparation of a lithium transition metal oxide.

BACKGROUND ART

In line with development of information technology (IT), various portable information and communication devices have entered widespread use and thus the 20 century is developing into a "ubiquitous society" where high quality information services are available regardless of time and place.

Lithium secondary batteries play a key role in such development towards the ubiquitous society.

Lithium secondary batteries have higher operating voltage and energy density, are used for a longer period of time than other secondary batteries and, thus, can satisfy sophisticated requirements according to diversification and increasing complexity of devices.

Recently, much effort globally has been put into expanding applications to eco-friendly transportation systems such as electric vehicles and the like, power storage, and the like through further advancement of conventional lithium secondary batteries.

As use of lithium secondary batteries is expanding to middle and large-scale devices, demand for lithium secondary batteries having larger capacity, higher output and higher safety characteristics than conventional lithium secondary batteries is increasing.

First, to obtain larger capacity, capacity per unit weight or unit volume of an active material must be high.

Secondly, tap density of an active material must be high. Packing density of an electrode may increase with increasing tap density. In particular, to manufacture an electrode, an active material is mixed with a binder or a conductive material and then coated on a current collector to form a thin film, and the electrode is hardened by applying pressure thereto. In this regard, when the active material is not satisfactorily filled, the electrode cannot be thinly manufactured and the volume thereof is large and, thus, larger capacity cannot be realized under given volume conditions of batteries.

Thirdly, a specific surface area of an active material must be small. When the specific surface area of the active material is large, a liquid phase is present on a surface of the active material. Accordingly, when the active material is coated on a current collector, a ratio of the liquid phase to the active material is high and, even after manufacturing an electrode, many surfaces exist between particles. Accordingly, electric flow is hindered and a large amount of binder for adhesion is required. Therefore, to reduce resistance of an electrode and enhance adhesion, a larger amount of a conductive material and a binder must be added and, as such, the amount of an active material decreases. Accordingly, larger capacity may not be obtained under limited volume conditions.

There is a tendency that the tap density of an active material increases with increasing precursor tap density. Therefore, technologies of the art are generally developed towards increase in tap density of the precursor. Tap density of a precursor is proportional to an average particle diameter of particles constituting the precursor.

DISCLOSURE

Technical Problem

However, apart from technologies for increasing tap density of an active material, particles constituting an active material are broken or crushed in a slurry preparation process and a rolling process when manufacturing an electrode.

Surfaces, which are not stabilized through heat treatment, of the broken or crushed particles side react with an electrolyte and, as such, forms films having high resistance. In addition, by-products formed by continuous reaction with the electrolyte are deposited at a negative electrode and, as such, performance of the negative electrode is deteriorated. In addition, the electrolyte is continuously consumed and, thus, swelling occurs due to generation of gases.

Technical Solution

The inventors of the present invention aim to address the aforementioned problems of the related art by using a transition metal precursor in which a ratio of tap density to average particle diameter D50 of the precursor satisfies the condition represented by Equation 1 below.

In accordance with one aspect of the present invention, provided is a transition metal precursor for preparation of a lithium transition metal oxide, in which the ratio of tap density to average particle diameter D50 of the precursor satisfies the condition represented by Equation 1 below:

$$0 < \frac{\text{Tap density}}{\text{Average particle diameter } D50 \text{ of transition of metal precursor}} < 3500 \text{ (g/cc·cm)}. \quad (1)$$

In Equation 1 above, the tap density indicates a bulk density of a powder obtained by vibrating a container under a constant conditions when filled with the powder, and the average particle diameter D50 of the transition metal precursor indicates a particle diameter corresponding to 50% of passed mass percentage in a grain size accumulation curve.

The ratio of tap density to average particle diameter D50 of the transition metal precursor may be 500:1 to 3500:1, 1000:1 to 3500:1, 1500:1 to 3500:1, or 2000:1 to 3500:1.

The transition metal precursor is a powder of an aggregate of particles (hereinafter, referred to as precursor particles) constituting the transition metal precursor. Similarly, a lithium composite transition metal oxide described below is a powder of an aggregate of particles (hereinafter, referred to as oxide particles) constituting the lithium composition transition metal oxide.

The transition metal precursor may be composed of one kind of transition metal or include two or more kinds of transition metals. The two or more kinds of transition metals may be at least two selected from the group consisting of nickel (Ni), cobalt (Co), manganese (Mn), aluminum (Al), copper (Cu), iron (Fe), magnesium (Mg), boron (B), chromium (Cr), and period 2 transition metals.

The transition metal precursor particles may be transition metal oxide particles, transition metal sulfide particles, transition metal nitride particles, transition metal phosphide particles, transition metal hydroxide particles, or the like.

In particular, the transition metal precursor particles may be transition metal hydroxide particles, more particularly a compound represented by Formula 2 below:

$$M(OH_{1-x})_2 \qquad (2)$$

wherein M represents at least two selected from the group consisting of Ni, Co, Mn, Al, Cu, Fe, Mg, B, Cr, and period 2 transition metals; and $0 \leq x \leq 0.5$. In this regard, M may include two transition metals selected from the group consisting of Ni, Co, and Mn or all thereof.

The average particle diameter D50 of the transition metal precursor may be 1 μm to 30 μm.

The present invention provides a lithium transition metal oxide prepared by mixing the transition metal precursor and a lithium precursor and sintering the mixture. A lithium transition metal oxide including at least two kinds of transition metals may be defined as a lithium composite transition metal oxide.

In this regard, a ratio of an average particle diameter D50 of lithium transition metal oxide to an average particle diameter D50 of transition metal precursor for preparation of the lithium transition metal oxide may satisfy the condition represented by Equation 3 below:

$$0 < \frac{\text{Average particle diameter } D50 \text{ of lithium transition metal oxide}}{\text{Average particle diameter } D50 \text{ of transition metal precursor}} < 1.2. \qquad (3)$$

The oxide particles constituting the lithium composite transition metal oxide may be a compound represented by Formula 4 below:

$$Li_aNi_xMn_yCo_zM_wO_{2-t}A_t \qquad (4)$$

wherein $0 < a \leq 1.2$, $0 \leq x \leq 0.9$, $0 \leq y \leq 0.9$, $0 \leq z \leq 0.9$, $0 \leq w \leq 0.3$, $2 \leq a+x+y+z+w \leq 2.3$, and $0 \leq t < 0.2$;

M is at least one metal cation selected from the group consisting of Al, Cu, Fe, Mg, B, Cr, and period 2 transition metals; and A is at least one monovalent or divalent anion.

In addition, the lithium composite transition metal oxide particles may be the compound of Formula 4 where x>y and x>z.

The lithium transition metal oxide may be composed of one kind of transition metal or include two or more kinds of transition metals. The two or more kinds of transition metals may be at least two selected from the group consisting of Ni, Co, Mn, Al, Cu, Fe, Mg, B, Cr, and period 2 transition metals.

The present invention also provides a lithium secondary battery in which a unit cell including a positive electrode including the lithium transition metal oxide described above, a negative electrode, and a polymer membrane disposed between the positive electrode and the negative electrode is accommodated in a battery case.

The lithium secondary battery may be a lithium ion battery, a lithium ion polymer battery, or a lithium polymer battery.

A positive electrode active material according to the present invention may further include other lithium-containing transition metal oxides in addition to the lithium transition metal oxide described above.

Examples of other lithium-containing transition metal oxides include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ where $0 \leq y \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-y}M_yO_2$ where M=Co, Mn, Al, Cu, Fe, Mg, B, or Ga, and $0.01 \leq y \leq 0.3$; lithium manganese composite oxides having the formula $LiMn_{2-y}M_yO_2$ where M=Co, Ni, Fe, Cr, Zn, or Ta, and $0.01 \leq y \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; and $Fe_2(MoO_4)_3$.

The positive electrode may be available from coating, on a positive electrode current collector, a slurry prepared by mixing a positive electrode mixture including the positive electrode active material and a solvent such as NMP or the like and drying and rolling the coated positive electrode current collector.

The positive electrode mixture may selectively include a conductive material, a binder, a filler, and the like, in addition to the positive electrode active material.

The positive electrode current collector is generally manufactured to a thickness of 3 to 500 μm. The positive electrode current collector is not particularly limited so long as it does not cause chemical changes in the manufactured battery and has high conductivity. For example, the positive electrode current collector may be made of copper, stainless steel, aluminum, nickel, titanium, sintered carbon, copper, or stainless steel surface-treated with carbon, nickel, titanium, silver, or the like, aluminum-cadmium alloys, or the like. The positive electrode current collector may have fine irregularities at a surface thereof to increase adhesion between the positive electrode active material and the positive electrode current collector. In addition, the positive electrode current collector may be used in any of various forms including films, sheets, foils, nets, porous structures, foams, and non-woven fabrics.

The conductive material is typically added in an amount of 1 to 30 wt % based on the total weight of a mixture including a positive electrode active material. There is no particular limit as to the conductive material, so long as it does not cause chemical changes in the manufactured battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and a conductive material and in binding of the active material to a current collector. The binder may be added in an amount of 1 wt % to 30 wt % based on the total weight of a mixture including a positive electrode active material. Non-limiting examples of the binder include polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is used as a component to inhibit positive electrode expansion. The filler is not particularly limited so long as it is a fibrous material that does not cause chemical changes in the manufactured battery. Examples of the filler include olefin-based polymers such as polyethylene and polypropylene; and fibrous materials such as glass fiber and carbon fiber.

As a dispersion solution, isopropyl alcohol, N-methylpyrrolidone (NMP), acetone, or the like may be used.

A method of uniformly coating a metal material with a paste of an electrode material may be selected from among known methods or an appropriate new method in consideration of properties and the like of materials. For example, a paste may be applied to a current collector and then uniformly dispersed thereon using a doctor blade or the like. In some cases, the application and dispersing processes may be simultaneously performed as a single process. In addition, die casting, comma coating, screen-printing, or the like may be used. In another embodiment, a paste of an electrode material may be molded on a separate substrate and then adhered to a current collector by pressing or lamination.

The paste coated on the metal plate is preferably dried in a vacuum oven at 50° C. to 200° C. for one day.

The negative electrode may be available from, for example, coating a negative electrode active material on a negative electrode current collector and drying the coated negative electrode current collector. As desired, as described above, components such as a conductive material, a binder, a filler, and the like may be selectively further added to the negative electrode active material.

The negative electrode current collector is typically manufactured to a thickness of 3 to 500 µm. The negative electrode current collector is not particularly limited so long as it does not cause chemical changes in the manufactured battery and has conductivity. For example, the negative electrode current collector may be made of copper, stainless steel, aluminum, nickel, titanium, sintered carbon, copper, or stainless steel surface-treated with carbon, nickel, titanium, silver, or the like, aluminum-cadmium alloys, or the like. As in the positive electrode current collector, the negative electrode current collector may have fine irregularities at a surface thereof to enhance adhesion between the negative electrode current collector and the negative electrode active material. In addition, the negative electrode current collector may be used in various forms including films, sheets, foils, nets, porous structures, foams, and non-woven fabrics.

Examples of the negative electrode active material include, but are not limited to, carbon such as hard carbon and graphite-based carbon; metal composite oxides such as $Li_xFe_2O_3$ where $0 \le x \le 1$, $Li_xWO_2$ where $0 \le x \le 1$, $Sn_xMe_{1-x}Me'_yO_z$ where Me: Mn, Fe, Pb, or Ge; Me': Al, B, P, Si, Group I, Group II and Group III elements, or halogens; $0 < x \le 1$; $1 \le y \le 3$; and $1 \le z \le 8$; lithium metal; lithium alloys; Si-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

A separator is disposed between the positive electrode and the negative electrode and, as the separator, an insulating thin film having high ion permeability and mechanical strength is used. The separator typically has a pore diameter of 0.01 to 10 µm and a thickness of 5 to 300 µm. As the separator, sheets or non-woven fabrics, made of an olefin polymer such as polypropylene, glass fibers or polyethylene, which have chemical resistance and hydrophobicity, or Kraft papers are used. Examples of commercially available separators include, but are not limited to, Celgard$^R$ series such as Celgard$^R$ 2400 and 2300 (available from Hoechest Celanese Corp.), polypropylene separators (available from Ube Industries Ltd., or Pall RAI Co.), and polyethylene series (available from Tonen or Entek).

In some cases, to enhance battery stability, a gel polymer electrolyte may be coated on the separator. Examples of such gel polymers include, but are not limited to, polyethylene oxide, polyvinylidenefluoride, and polyacrylonitrile.

When a solid electrolyte such as a polymer or the like is used as an electrolyte, the solid electrolyte may also serve as both the separator and electrolyte.

A lithium salt-containing non-aqueous electrolyte is composed of a non-aqueous electrolyte and a lithium salt. As the non-aqueous electrolyte, a non-aqueous electrolytic solution, an organic solid electrolyte, or an inorganic solid electrolyte may be used.

For example, the non-aqueous electrolytic solution may be an aprotic organic solvent such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, or the like.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

BRIEF DESCRIPTION OF THE DRAWINGS

The above and other objects, features and other advantages of the present invention will be more clearly understood from the following detailed description taken in conjunction with the accompanying drawing, in which.

BEST MODE

Figure 1:
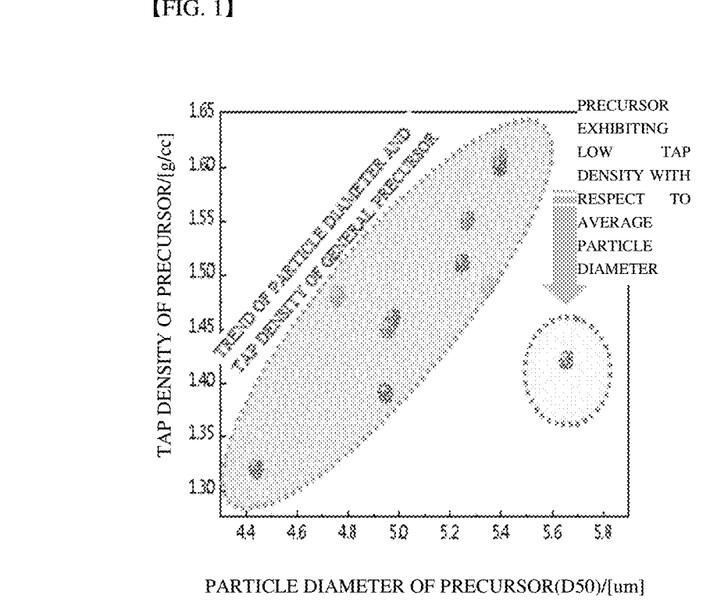
FIG. 1 is a graph illustrating a relationship between tap density and average particle diameter D50 of each of transition metal precursors according to examples and comparative examples of the present invention.
Figure 2:
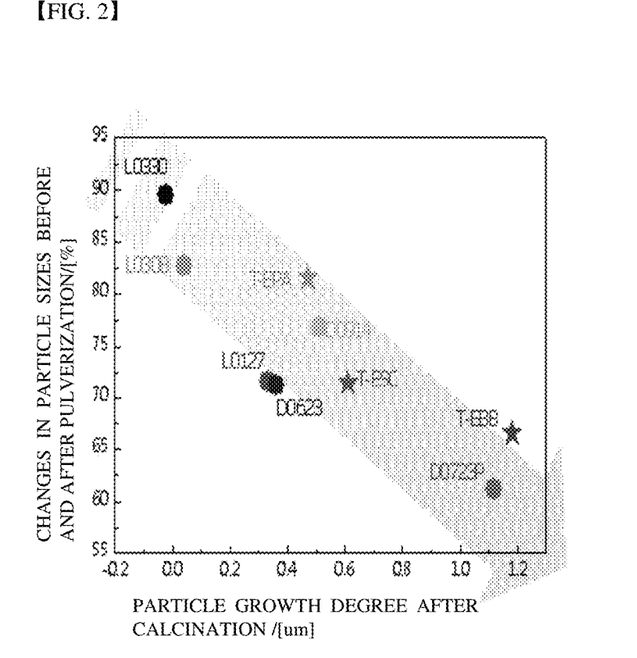
FIG. 2 is a graph illustrating a relationship between changes in particle sizes before and after forming into powder of each of lithium transition metal oxides according to examples and comparative examples of the present invention and a degree of particle growth after calcination of the lithium transition metal oxides.
Figure 3:
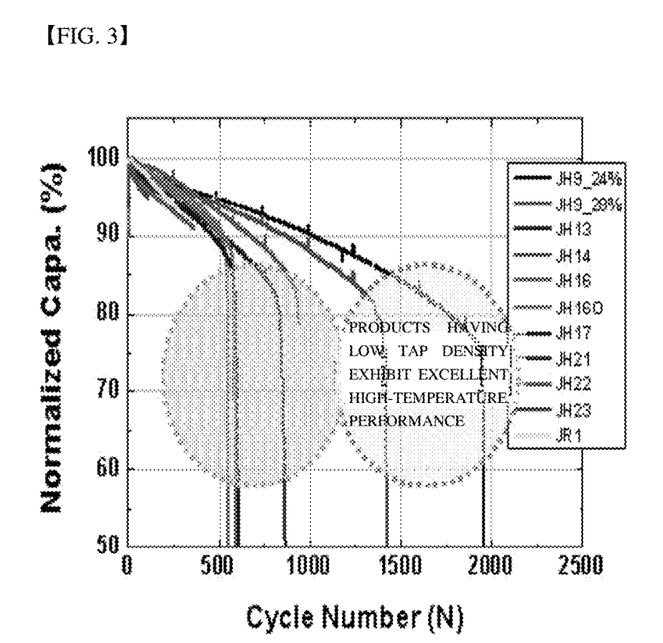
FIG. 3 is a graph illustrating lifespan characteristics of lithium secondary batteries manufactured using the lithium transition metal oxides of examples and comparative examples of the present invention.

Now, the present invention will be described in more detail with reference to the following examples. These examples are provided for illustrative purposes only, should not be construed as limiting the scope and spirit of the present invention and are obvious to those of ordinary skill in the art to which the present invention pertains. In addition, those of ordinary skill in the art may carry out a variety of applications and modifications based on the foregoing teachings within the scope of the present invention, and these modified embodiments may also be within the scope of the present invention.

Example 1

Nickel sulfate, cobalt sulfate, and manganese sulfate were mixed in a molar ratio of 0.45:0.15:0.40 to prepare a 1.5 M aqueous transition metal solution, and a 3 M aqueous sodium hydroxide solution was prepared.

The aqueous transition metal solution was added to a wet reactor maintained at 45° C. to 50° C. and containing distilled water, the aqueous sodium hydroxide solution was added thereto so that pH of the distilled water inside the wet reactor was maintained at 10.5 to 11.5, and a 30% ammonia solution as an additive was continuously supplied to the wet reactor at a flow rate of $1/20$ to $1/10$ that of the aqueous transition metal solution.

The flow rates of the aqueous transition metal solution, the aqueous sodium hydroxide solution, and the ammonia solution were adjusted so that average residence time thereof in the wet reactor was approximately 6 hours.

The number of revolutions per minute of a stirrer during reaction was maintained at 800 to 1000 rpm.

After reaching a normal state, a nickel-cobalt-manganese composite transition metal precursor prepared through continuous reaction for 20 hours was washed several times with distilled water and dried in a constant temperature dryer at 120° C. for 24 hours, resulting in obtainment of a nickel-cobalt-manganese composite transition metal precursor.

Example 2

A transition metal precursor was prepared in the same manner as in Example 1, except that, during reaction, the 30% ammonia solution as an additive was continuously supplied to the wet reactor at a flow rate of $1/10$ to $1/5$ that of the aqueous transition metal solution.

Example 3

A transition metal precursor was prepared in the same manner as in Example 1, except that the number of revolutions per minute of the stirrer during reaction was maintained at 600 rpm to 800 rpm.

Comparative Example 1

Nickel sulfate, cobalt sulfate, and manganese sulfate were mixed in a molar ratio of 0.45:0.15:0.40 to prepare a 1.5 M aqueous transition metal solution, and a 3 M aqueous sodium hydroxide solution was prepared.

The aqueous transition metal solution was added to a wet reactor maintained at 45° C. to 50° C. and containing distilled water, the aqueous sodium hydroxide solution was added thereto so that pH of the distilled water inside the wet reactor was maintained at 9.5 to 10.5, and a 30% ammonia solution as an additive was continuously supplied to the wet reactor at a flow rate of $1/20$ to $1/10$ that of the aqueous transition metal solution. The flow rates of the aqueous transition metal solution, the aqueous sodium hydroxide solution, and the ammonia solution were adjusted so that average residence time thereof in the wet reactor was approximately 6 hours.

The number of revolutions per minute of a stirrer during reaction was maintained at 1200 to 1400 rpm.

After reaching a normal state, a nickel-cobalt-manganese composite transition metal precursor prepared through continuous reaction for 20 hours was washed several times with distilled water and dried in a constant temperature dryer at 120° C. for 24 hours, resulting in obtainment of a nickel-cobalt-manganese composite transition metal precursor.

Comparative Example 2

A transition metal precursor was prepared in the same manner as in Comparative Example 1, except that, during reaction, the ammonia solution as an additive was not continuously supplied.

Experimental Example 1

50 g of each of the transition metal precursor prepared according to each of Examples 1 to 3 and Comparative Examples 1 and 2 was added to a 100 cc cylinder for tapping using a KYT-4000 measuring device (available from SEISHIN) and then was tapped 3000 times. In addition, powder distribution based on volume was obtained using S-3500 (available from Microtrac), D50 values were measured, and tap density with respect to D50 was calculated. Results are shown in Table 1 below.

TABLE 1

| | Tap density (g/cc) | D50 (μm) | Tap density/D50 (g/cc · cm) |
|---|---|---|---|
| Example 1 | 1.42 | 5.62 | 2527 |
| Example 2 | 1.52 | 5.66 | 2686 |
| Example 3 | 1.60 | 5.70 | 2807 |
| Comparative Example 1 | 1.99 | 5.48 | 3631 |
| Comparative Example 2 | 1.81 | 5.13 | 3528 |

As shown in Table 1 above, it can be confirmed that the transition metal precursors according to the present invention (Examples 1 to 3) have a low ratio of tap density to D50, namely, 3500 or less, while the transition metal precursors of Comparative Examples 1 and 2 have a high ratio of tap density to D50, namely, 3500 or more.

Experimental Example 2

Each of the transition metal precursors of Examples 1 to 3 and Comparative Examples 1 and 2 was mixed with $Li_2CO_3$ so that a molar ratio of Li to Ni+Co+Mn was 1.10 and the mixture was heated at a heating rate of 5° C./min and calcined at 950° C. for 10 hours, to prepare a lithium transition metal oxide powder as a positive electrode active material.

D50 corresponding to powder distribution based on volume of each of the prepared positive electrode active material powders was measured using S-3500 (available from Microtrac) and each positive electrode active material powder was subjected to ultrasonic dispersion for 60 seconds. Subsequently, D50 corresponding to powder distribution based on volume thereof was measured again. Subsequently, changes in particle sizes before and after pulverization following the two processes were calculated, and results are summarized in Table 2 below.

TABLE 2

| | D50 (μm) of precursor | D50 (μm) of active material | D50 of active material/D50 of precursor (changes in particle sizes before and after calcination) |
|---|---|---|---|
| Example 1 | 5.62 | 5.65 | 1.005 |
| Example 2 | 5.66 | 5.64 | 0.996 |
| Example 3 | 5.70 | 5.68 | 0.996 |
| Comparative Example 1 | 5.48 | 6.60 | 1.204 |
| Comparative Example 2 | 5.13 | 6.31 | 1.230 |

As shown in Table 2 above, it can be confirmed that, in the same transition metal composition, the lithium transition metal oxides prepared from the transition metal precursors according to the present invention (Examples 1 to 3) have small changes in particle sizes before and after calcination, namely, 1.2 or less, while the lithium transition metal oxides prepared from the transition metal precursors of Comparative Examples 1 and 2 have large changes in particle sizes before and after calcination, namely, 1.2 or more.

Experimental Example 3

10 g of the positive electrode active material powder using each of the transition metal precursors of Examples 1 to 3 and Comparative Examples 1 and 2 was added to a PDM-300 paste mixer, alumina beads with a diameter of 5 mm were added thereto, and each positive electrode active material powder was pulverized using a ball mill under a condition of 600×600 based on revolutions (rpm) per minute (rpm)×revolutions per minute (rpm). The pulverized active material powder was subjected to ultrasonic dispersion for 60 seconds using S-3500 available from Microtrac and then D50 corresponding to powder distribution based on volume thereof was measured again.

Subsequently, changes in particle sizes before and after pulverization following the two processes were calculated, and results are summarized in Table 3 below.

TABLE 3

| | D50 (μm) before pulverization | D50 (μm) after pulverization | D50 after pulverization/D50 before pulverization |
|---|---|---|---|
| Example 1 | 5.65 | 5.05 | 0.894 |
| Example 2 | 5.64 | 5.00 | 0.887 |
| Example 3 | 5.68 | 4.98 | 0.847 |
| Comparative Example 1 | 6.60 | 4.04 | 0.612 |
| Comparative Example 2 | 6.31 | 4.20 | 0.666 |

As shown in Table 3 above, it can be confirmed that, in the same transition metal composition, the lithium transition metal oxides prepared from the transition metal precursors according to the present invention (Examples 1 to 3) exhibit small changes in particle sizes during pulverization and, thus, the positive electrode active materials exhibit high strength. On the contrary, the lithium transition metal oxides prepared from the transition metal precursors of Comparative Examples 1 and 2 exhibit low strength.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

A transition metal precursor according to the present invention has a lower tap density than conventional transition metal precursors consisting of conventional transition metal precursor particles, when average particle diameter D50 of the transition metal precursor of the present invention is substantially the same as those of conventional transition metal precursors.

In this regard, the expression "substantially the same as" means average particle diameter D50 within a measurement error range of 0.2 μm or less.

As a result, a lithium transition metal oxide prepared using the transition metal precursor according to the present invention exhibits a smaller change in average particle diameter D50 during sintering, when compared with conventional lithium transition metal oxides, and has a higher strength, when compared with lithium transition metal oxides prepared using conventional transition metal precursors.

Therefore, by using a lithium secondary battery using the lithium transition metal oxide as a positive electrode active material, breaking or crushing of lithium transition metal oxide particles during rolling may be minimized and, as such, the lithium secondary battery exhibits improved high temperature characteristics, lifespan characteristics, and safety.

In addition, reduction in capacity may be minimized and output characteristics may be improved.

The invention claimed is:

1. A transition metal precursor for preparation of a lithium transition metal oxide, wherein precursor particles constituting the transition metal precursor are transition metal hydroxide particles, wherein the transition metal hydroxide particles are a compound represented by Formula 2 below:

$$M(OH_{1-x})_2 \tag{2}$$

wherein M consists of nickel (Ni), cobalt (Co), and manganese (Mn); and $0 \leq x \leq 0.5$; and wherein a tap density of the transition metal precursor is from 1.3 g/cc to 1.6 g/cc, and a ratio of tap density to average particle diameter D50 of the precursor satisfies a condition represented by Equation 1 below:

$$2000 < \frac{\text{Tap density}}{\text{Average particle diameter } D50 \text{ of transition of metal precursor}} < 3500 \text{ (g/cc} \cdot \text{cm)}. \tag{1}$$

2. The transition metal precursor according to claim 1, wherein the transition metal precursor has an average particle diameter D50 of 1 to 30 μm.

* * * * *